United States Patent
Hong et al.

(10) Patent No.: US 10,139,974 B2
(45) Date of Patent: Nov. 27, 2018

(54) SENSOR AND DISPLAY DEVICE HAVING THE SAME

(71) Applicant: Samsung Display Co., Ltd., Yongin-si (KR)

(72) Inventors: Won Ki Hong, Yongin-si (KR); Young Seok Seo, Yongin-si (KR); Jong Ho Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 15/362,220

(22) Filed: Nov. 28, 2016

(65) Prior Publication Data

US 2017/0357344 A1    Dec. 14, 2017

(30) Foreign Application Priority Data

Jun. 10, 2016    (KR) .................. 10-2016-0072327

(51) Int. Cl.
  *G06F 3/044*    (2006.01)
  *G06F 3/045*    (2006.01)

(52) U.S. Cl.
  CPC .............. *G06F 3/044* (2013.01); *G06F 3/045* (2013.01); *G06F 2203/04106* (2013.01); *Y10S 977/773* (2013.01)

(58) Field of Classification Search
  CPC ........ G06F 3/044; G06F 3/045; G06F 3/0414; G06F 2203/04103; G06F 2203/04106; G06F 2203/04111; Y10S 977/773
  See application file for complete search history.

(56) References Cited

U.S. PATENT DOCUMENTS

| | | | |
|---|---|---|---|
| 7,538,760 B2 | 5/2009 | Hotelling et al. | |
| 8,654,524 B2 | 2/2014 | Pance et al. | |
| 8,686,952 B2 | 4/2014 | Burrough et al. | |
| 8,780,060 B2 | 7/2014 | Maschmeyer et al. | |
| 8,787,006 B2 | 7/2014 | Golko et al. | |
| 9,116,570 B2 | 8/2015 | Lee et al. | |
| 9,178,509 B2 | 11/2015 | Bernstein | |
| 9,274,660 B2 | 3/2016 | Bernstein et al. | |
| 2005/0162408 A1* | 7/2005 | Martchovsky | G06F 3/044 345/173 |
| 2007/0125181 A1 | 6/2007 | Ofek et al. | |
| 2012/0019265 A1* | 1/2012 | Yoshikawa | G06F 3/0416 324/677 |
| 2012/0139864 A1* | 6/2012 | Sleeman | G06F 3/044 345/174 |

(Continued)

FOREIGN PATENT DOCUMENTS

| | | |
|---|---|---|
| KR | 10-2014-0026934 | 3/2014 |
| KR | 10-2016-0008359 | 1/2016 |

*Primary Examiner* — Tom Sheng
(74) *Attorney, Agent, or Firm* — H.C. Park & Associates, PLC

(57) ABSTRACT

A display device includes a display panel configured to display an image, and a sensor provided on at least one surface of the display panel and configured to sense a touch location and a touch pressure. The sensor includes a sensing unit having sensing electrodes formed on a same layer, and of which a capacitance changes according to a touch, and a resistance element disposed on the sensing unit, and of which a resistance changes according to a pressure of the touch. Accordingly, touch and touch intensity can both be sensed.

25 Claims, 12 Drawing Sheets

(56) References Cited

U.S. PATENT DOCUMENTS

| | | | |
|---|---|---|---|
| 2014/0028575 A1 | 1/2014 | Parivar et al. | |
| 2014/0085213 A1 | 3/2014 | Huppi et al. | |
| 2014/0109698 A1 | 4/2014 | Lussey et al. | |
| 2014/0168139 A1* | 6/2014 | Ku | G09G 3/20 345/174 |
| 2014/0293145 A1 | 10/2014 | Jones et al. | |
| 2015/0091849 A1* | 4/2015 | Ludden | G06F 3/0412 345/174 |
| 2015/0130762 A1* | 5/2015 | Wang | G06F 3/0416 345/174 |
| 2015/0277648 A1* | 10/2015 | Small | G06F 3/0416 345/174 |
| 2016/0011707 A1 | 1/2016 | Yang et al. | |
| 2016/0098110 A1* | 4/2016 | Choi | G06F 3/0416 345/173 |
| 2016/0239131 A1* | 8/2016 | Kang | G06F 3/044 |
| 2017/0083151 A1* | 3/2017 | Khazeni | G06F 3/0418 |
| 2017/0160829 A1* | 6/2017 | Liu | G06F 3/044 |
| 2017/0350822 A1* | 12/2017 | Bower | G01N 21/78 |

* cited by examiner

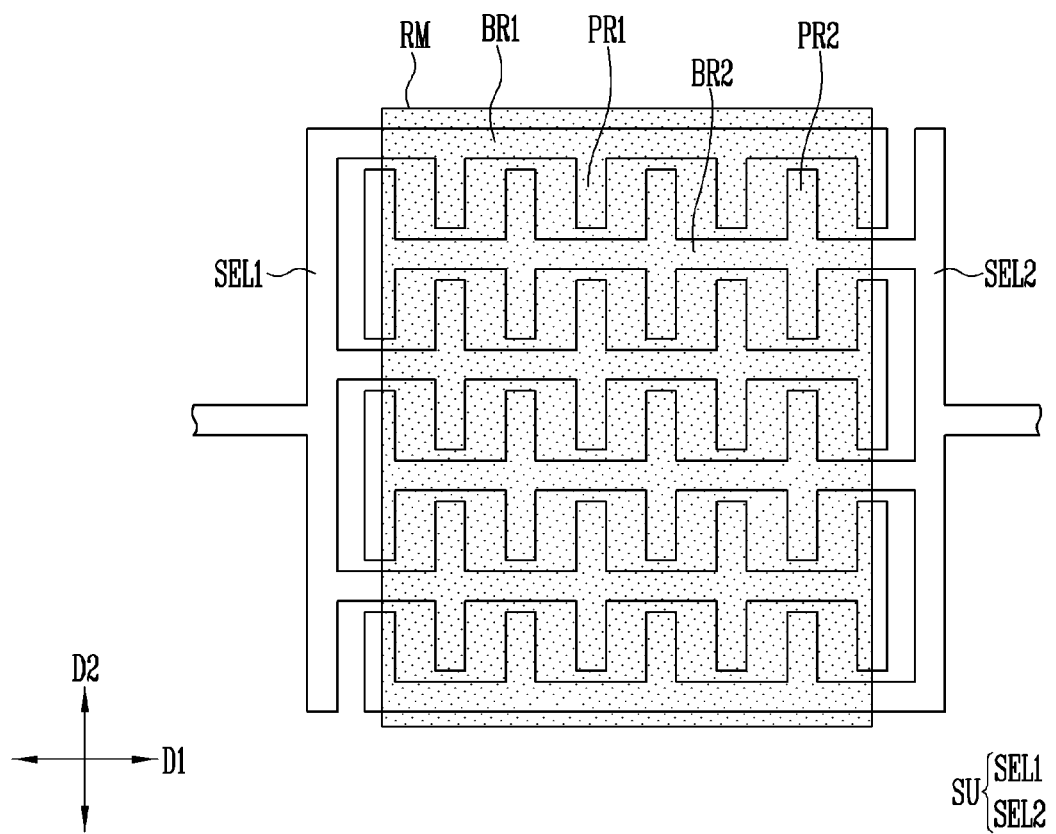

SENSOR AND DISPLAY DEVICE HAVING THE SAME

CROSS-REFERENCE TO RELATED APPLICATION

This application claims priority from and the benefit of Korean Patent Application number 10-2016-0072327, filed on Jun. 10, 2016, which is hereby incorporated by reference for all purposes as if fully set forth herein.

BACKGROUND

Field

Exemplary embodiments relate to a sensor and a display device having the same.

Discussion of the Background

As the use of portable devices increases for access to information and media, the display devices used by these portable devices have become more important.

Recent display devices are being equipped with both image display functions and touch sensors for receiving inputs of a user's touch. Accordingly, users have become able to interact with display devices more conveniently through touch sensors.

Further, recent efforts have been made to provide various functions to users using not only touch sensing but also using pressure or force sensing.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a sensor for identifying an intensity of a touch.

Exemplary embodiments also provide a sensor for complexly identifying a touch point and an intensity of the touch at the same time.

Exemplary embodiments further provide a display device equipped with the aforementioned sensor and/or a touch sensor.

Additional aspects will be set forth in the detailed description which follows, and, in part, will be apparent from the disclosure, or may be learned by practice of the inventive concept.

An exemplary embodiment discloses a display device that includes a display panel configured to display an image, and a sensor provided on at least one surface of the display panel and configured to sense a touch location and a touch pressure. The sensor includes a sensing unit having sensing electrodes formed on a same layer, and of which a capacitance changes according to a touch, and a resistance element disposed on the sensing unit, and of which a resistance changes according to a pressure of the touch.

An exemplary embodiment also discloses a touch sensor that includes a substrate, a sensing unit comprising sensing electrodes formed on a same layer on the substrate which changes capacitance according to a touch, and a resistance element provided on the sensing unit which changes resistance according to a pressure of the touch.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 7A and 7B are plan views each illustrating shapes of electrodes in sensors according to an exemplary embodiment.

DETAILED DESCRIPTION OF THE ILLUSTRATED EMBODIMENTS

Figure 1:
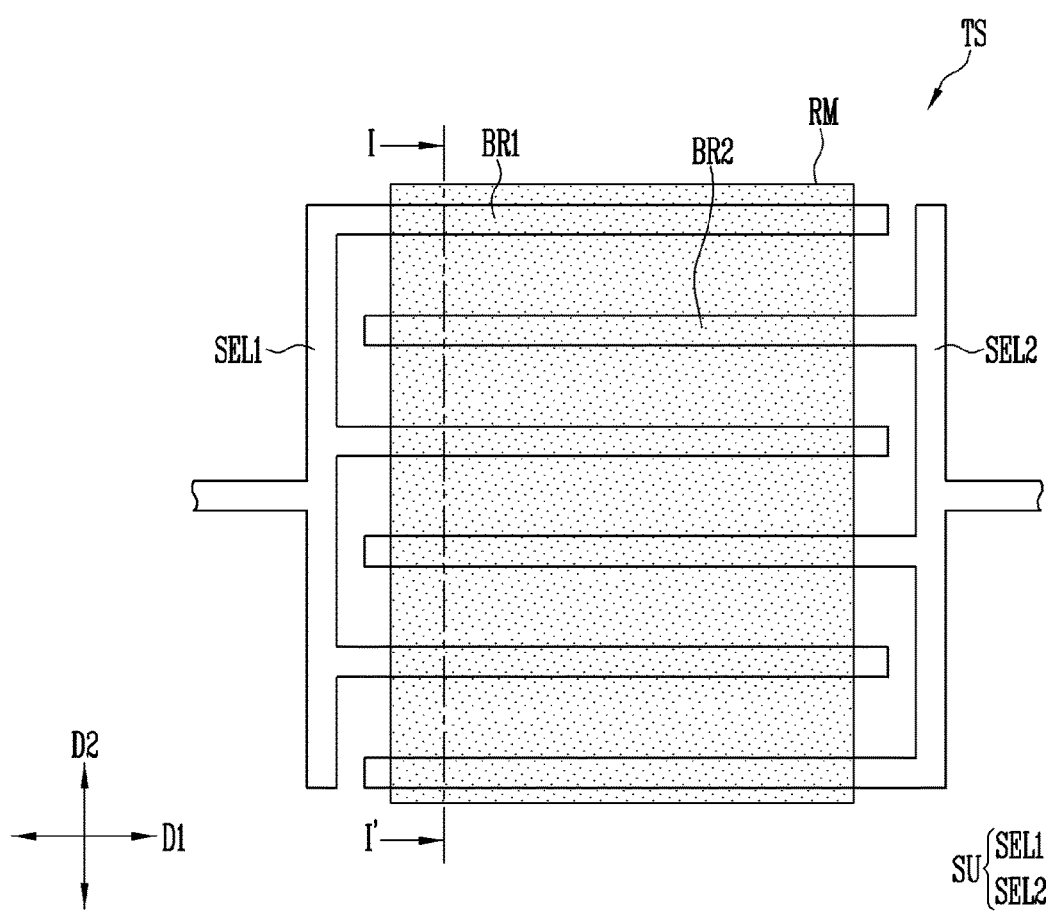
FIG. 1 is a plan view illustrating a sensor according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Accordingly, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
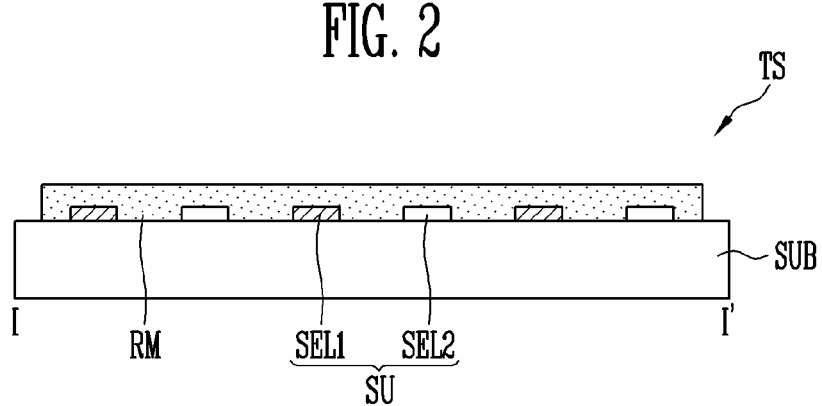
FIG. 2 is a cross-sectional view taken on line I-I' of FIG. 1.

FIG. 1 is a plan view illustrating the sensor according to an exemplary embodiment. FIG. 2 is a cross-sectional view taken on line I-I' of FIG. 1.

Referring to FIGS. 1 and 2, a sensor TS according to an exemplary embodiment includes a substrate SUB, a sensing unit SU provided on the substrate SUB and a resistance element RM.

At least a portion of the sensor TS may be flexible, and the at least a portion of the sensor TS may be transformed into various shapes such as being bent, folded, or rolled, etc. For this purpose, at least a portion of elements forming the sensor TS may be flexible. For example, at least a portion of the substrate SUB, the sensing unit SU provided on the substrates SUB and the resistance element RM may be flexible.

The substrate SUB may be made of an insulating material such as glass, organic polymer, and crystal, etc. Further, the substrate SUB may be made of a flexible material such that it may be bent or folded, and the substrate SUB may have a single-layered structure or a multiple-layered structure.

The substrate SUB may contain at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose and cellulose acetate propionate. However, other various materials may be used to form the substrate SUB such as fiberglass reinforced plastic (FRP) and the like.

The sensing unit SU may include sensing electrodes that change capacitances according to a user's touch. The sensor TS may senses changes in the capacitances of the sensing electrodes, thereby providing information on whether or not there is a user's touch.

The sensing electrodes may be provided on the substrate SUB, and include a first sensing electrode SEL1 and a second sensing electrode SEL1 that are spaced apart from each other.

The first sensing electrode SEL1 may contain a conductive material. The conductive material may contain a metal or an alloy thereof. Examples of the metal include gold (Au), silver (Ag), aluminum (Al), molybdenum (Mo), chrome (Cr), titanium (Ti), nickel (Ni), neodymium (Nd), copper (Cu) and platinum (Pt), etc. The first sensing electrode SEL1 may be made of a transparent conductive material. Examples of the transparent conductive material include silver nanowire (AgNW), indium tin oxide (ITP), indium zinc oxide (IZO), antimony zinc oxide (AZO), Indium Tin Zinc Oxide (ITZO), zinc oxide (ZnO), tin oxide (SnO2), carbon nanotube and graphene, etc.

The second sensing electrode SEL2 may be spaced apart from the first sensing electrode SEL1 and contains a conductive material. The conductive material may be selected from the materials that may form the first sensing electrode SEL1, and may be made of a same material as the first electrode SEL1 or a different material from the first electrode SELL The first sensing electrode SEL1 may have a plurality of first branches BR1 that are spaced apart from each other. The first branches BR1 may extend along one direction, for example, a first direction D1, and may be arranged along a direction intersecting with the first direction D1 (for example, a second direction D2). At least a portion of the first branches BR1 may be connected to adjacent branches.

The second sensing electrode SEL2 may have a plurality of second branches BR2 that are spaced apart from each other. The second branches BR2 may extend along one direction, for example, the first direction D1, and may be arranged along the second direction D2. At least a portion of the second branches BR2 may be connected to adjacent branches.

The first branches BR1 of the first sensing electrodes SEL1 and the second branches BR2 of the second sensing electrodes SEL2 may be arranged alternately to each other. As the first branches BR1 and the second branches BR2 are arranged alternately to each other, a distance between the first branches BR1 and the second branches BR2 may become shorter and areas facing each other may increase. Accordingly, the capacitance between the first sensing electrode SEL1 and the second sensing electrode SEL2 may increase, and an amount of change in the capacitance may be easily sensed.

However, the shape of the first and second sensing electrodes SEL1, SEL2 is not limited to the aforementioned, and thus, the first and second sensing electrodes SEL1, SEL2 may have various shapes. For example, the shape or extending direction of the first and second branches BR1, BR2 of the first and second sensing electrodes SEL1, SEL2 may be set differently.

The sensing electrodes may be formed through a single process. The first and second sensing electrodes SEL1, SEL2 may be formed as they are patterned through a one time photolithography using one mask, or by coating. Accordingly, the first and second sensing electrodes SEL1, SEL2 may contain the same material, and may be provided in a single-layered form. In this case, the first and second sensing electrodes SEL1, SEL2 share a same lower film. In other words, the first and second sensing electrodes SEL1, SEL2 may be provided on a same layer and/or a same plane.

The first and second sensing electrodes SEL1 and SEL2 may all be formed on the substrate SUB. When another layer is provided on the substrate SUB, all of the first and second electrodes SEL1 and SEL2 may be provided on the other layer.

The resistance element RM may be provided on the first and second sensing electrodes, SEL1 and SEL2, of the sensing unit SU, and may be a force sensor together with the sensing unit SU. Resistances of the resistance element RM may change according to a user's touch, and the resistance element RM may sense the change of resistance, thereby providing information on the pressure or force of the user's touch, that is, the intensity of the touch.

The resistance element RM may be provided on the first sensing electrode SEL1 and the second sensing electrode SEL2 such that it overlaps with the first sensing electrode SEL1 and the second sensing electrode SEL2.

The resistance element RM may be an element of which electrical characteristics change according to the extent it is transformed. Specifically, the resistance element RM may contain a material of which the resistance changes according to the pressure between the first sensing electrode SEL1 and the second sensing electrode SEL2. The resistance element RM may contain materials that are called force sensitive materials or force sensitive resistors.

In an exemplary embodiment of the present disclosure, the resistance element RM includes conductive nano-particles.

The nano-particles may be provided as nanotubes, nano-columns, nanorods, nanopores or nanowires, etc. The nano-particles may contain particles of carbon, graphite, metalloid, metal, a conductive oxide of metalloid or metal, or a conductive nitride of metalloid or metal, or particles of core shell structures of insulating beads coated with the particles, or a combination thereof. The metalloid may contain any one of antimony (Sb), germanium (Ge), arsenic (As), and an alloy thereof. The metal may contain zinc (Zn), aluminum (Al), scandium (Sc), chrome (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti) or an alloy thereof. The conductive oxide may contain indium-tin-oxide (ITO), indium-zinc-oxide (IZO), zinc oxide doped with aluminum (AZO), gallium-indium-zinc-oxide (GIZO), zinc oxide, or a mixed compound thereof.

The resistance element RM may further contain a matrix having said nano-particles distributed inside thereof and having elasticity. The matrix has elasticity such that it may be deformed by an external pressure (for example, the pressure by the user's hand or a stylus), and once the pressure from outside is removed, that it may be restored to its original state. The matrix may be provided as a porous polymer so that it has said elasticity. The matrix may be provided in the form of a foam, such as sponge. The matrix may contain, for example, thermoplastic elastomer, polystyrene, polyolefin, polyurethane thermoplastic elastomers, polyamides, synthetic rubbers, polydimethylsiloxane, polybutadiene, polyisobutylene, poly(styrene-butadienestyrene), polyurethanes, polychloroprene, polyethylene, silicone and a combination thereof, but without limitation. In an exemplary embodiment of the present disclosure, the nano-particles may be provided on the porous surface of the matrix in a method of pigmentation or the like, but without limitation.

According to prior art inventions, it is known to form the first and second sensing electrodes SEL1 and SEL2 using photolithography two or more times and using separate masks, but according to an exemplary embodiment of the present disclosure, it is possible to form the first and second sensing electrodes SEL1 and SEL2 using photolithography only once using a single mask. Accordingly, the manufacturing process may be simplified and the manufacturing cost may be reduced.

In a sensor according to an exemplary embodiment, the sensing unit SU may be manufactured in a single-layered structure, and the resistance element RM may be manufactured in a thin film form, thereby resulting in an ultra-thin film sensor. The thickness of the sensing unit SU and the resistance element RM may be at or below about 1 micrometer.

Figure 3:
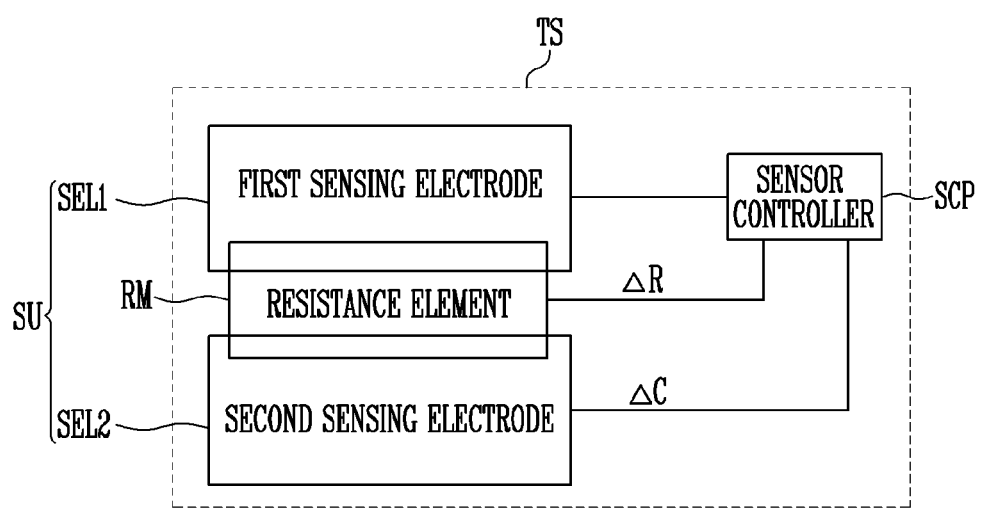
FIG. 3 is a view illustrating a sensor according to an exemplary embodiment.
Figure 4A:
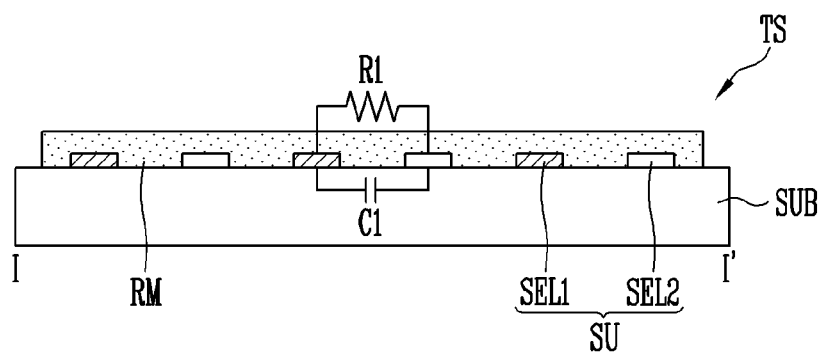
FIGS. 4A and 4B are views illustrating operations of a sensor according to an exemplary embodiment, with FIG. 4A illustrating the sensor when a pressure is not applied from outside and FIG. 4B illustrating the sensor when a pressure is applied from outside.
Figure 4B:
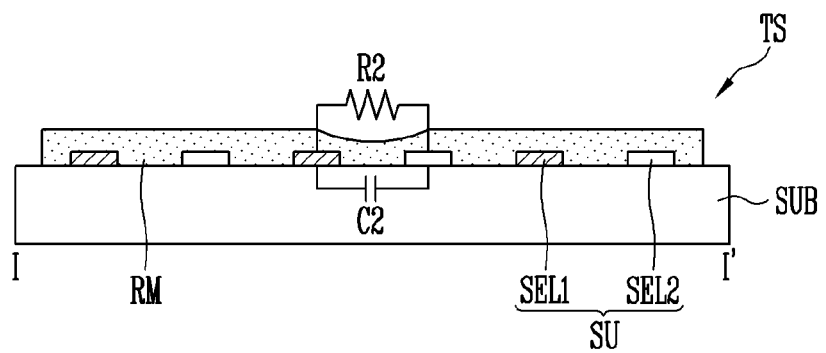

FIG. 3 is a view illustrating a sensor TS that includes a sensor controller SCP according to an exemplary embodiment. FIGS. 4A and 4B are views illustrating operations of the sensor TS according to an exemplary embodiment. FIG. 4A illustrates the appearance of the sensor TS when a pressure is not applied from outside and FIG. 4B illustrates the appearance of the sensor TS when a pressure is applied from outside.

Referring to FIG. 3, a sensor TS according to an exemplary embodiment may further include a sensor controller SCP.

The sensor controller SCP may detect whether or not there is a touch and a touch pressure by sensing a change of capacitance $\Delta C$ existing between the first sensing electrode SEL1 and the second sensing electrode SEL2, and a change of resistance $\Delta R$ of the resistance element RM.

For this purpose, the sensor controller SCP may be connected to the first sensing electrode SEL1 and the second sensing electrode SEL2, and connected to the resistance element RM by the first and second sensing electrode SEL1, SEL2.

A driving signal may be applied to the first sensing electrode SEL1 from the sensor controller SCP, and the sensor controller SCP may obtain a sensed signal in which the change of capacitance $\Delta C$ and/or the change of resistance $\Delta R$ are reflected. For example, the sensor controller SCP may detect the amount of change of capacitance $\Delta C$ by sensing an amount of change of current flowing to the second sensing electrode SEL2, and detect the change of resistance $\Delta R$ by sensing the voltage of the resistance element RM. There may be various additional methods for detecting the change of capacitance $\Delta C$ and/or the change of resistance $\Delta C$, $\Delta R$ without departing from a scope of the inventive concepts.

Referring to FIGS. 3, 4A, and 4B, the first sensing electrode SEL1 and the second sensing electrode SEL2 may be provided on the same plane. Based on an assumption that the plane formed by the first sensing electrode SEL1 and the second sensing electrode SEL2 is parallel to an X-Y plane, that is, a plane where X axis and Y axis intersect each other and that a direction perpendicular to the X-Y plane represents Z axis, a user's touch may exist on the X-Y plane and its location may be represented by an X coordinate and a Y coordinate. A Z coordinate may change according to the pressure of a touch, and accordingly, the pressure of the touch may be represented by the Z coordinate or a function related to the Z coordinate. Here, the pressure does not simply represent the pressure perpendicular to the X-Y plane, but the pressure may also include the pressure being applied obliquely against the X-Y plane. That is, if the pressure has a vector of Z axis direction, an intensity of the pressure may be indicated by the Z coordinate value.

In a sensor TS according to an exemplary embodiment, the first sensing electrode SEL1 and the second sensing electrode SEL2 are spaced apart from each other having the resistance element RM disposed therebetween. When a pressure caused by a touch on the sensor TS is applied, a distance between the nano-particles inside the resistance element RM corresponding to an area where the pressure is applied may change. When the distance between the nano-particles changes, electrical characteristics of the sensor, for example, the resistance, changes. That is, supposing the resistance when there is no external pressure is a first resistance R1 and a resistance when there is an external pressure is a second resistance R2, the resistance changes as the distance between the nano-particles changes. For example, when a change of the distance is negative, the resistance may also reduce, and thus a change of the resistance $\Delta R$ may also be negative. Changes in the electrical characteristics caused by the change of distance between the nano-particles may be because of the tunneling effect between the nano-particles, or because of the current carrying effect due to direct contacting between the nano-particles.

The first sensing electrode SEL1 and the second sensing electrode SEL2 may be connected to the sensor controller SCP by a separate line. The sensor controller SCP may sense an intensity of the touch pressure by sensing the change of resistance $\Delta R$ caused by the change of distance between the first sensing electrode SEL1 and the second sensing electrode SEL2.

In an exemplary embodiment, an external touch changes the capacitance between the first sensing electrode SEL1 and the second sensing electrode SEL2. That is, supposing the capacitance when there is no external touch is a first capacitance C1 and a capacitance when there is an external touch is a second capacitance C2, the capacitance changes when there is a user's touch.

The sensor controller SCP may sense whether or not there is an external touch by sensing the change of capacitance $\Delta C$ between the first sensing electrode SEL1 and the second sensing electrode SEL2.

The sensor TS may sense the change of resistance and the change of capacitance at the same time or according to a predefined order. Accordingly, a touch location and a pressure size may be sensed easily, and the sensitivity of the sensing may improve as well. Moreover, since the sensor is capable of detecting the change of capacitance and the change of resistance together, it is possible to sense a touch even in a situation where only one of the change of capacitance and the change of resistance can be sensed. For example, in the case of a hovering where there is no contact with the sensor, a touch may be sensed by sensing the change of capacitance.

In sensing the change of capacitance, the sensor controller SCP may be connected to each of the first sensing electrode SEL1 and the second sensing electrode SEL2, and may sense a mutual capacitance.

As the sensor TS according to the embodiment of the present disclosure is capable of sensing the change of resistance $\Delta R$ and the change of capacitance $\Delta C$ at the same time or sequentially, it is possible to easily obtain information on whether or not there is a touch from outside and on an intensity of a touch pressure.

In the sensor TS, whether or not there is a touch and a touch pressure may be interpreted in various ways depending on the intensity of the pressure. The sensor controller SCP of the sensor TS may designate a predetermined criteria, and then compare the intensity of the pressure with the predetermined criteria so as to control whether or not to input information according to the pressure. For example, the sensor controller SCP may determine that there is a touch only when the size of the pressure is or above the predetermined criteria, and determine that there is no touch when the size of the pressure is below the predetermined criteria. In another example, the sensor controller SCP may identify information on an input differently depending on the size of the pressure, that is, when the size of the pressure exceeds the predetermined criteria, the sensor controller SCP may determine the input as a button double click, and when the size of the pressure is below the predetermined criteria, the sensor controller SCP may determine the input as a single click.

Figure 5:
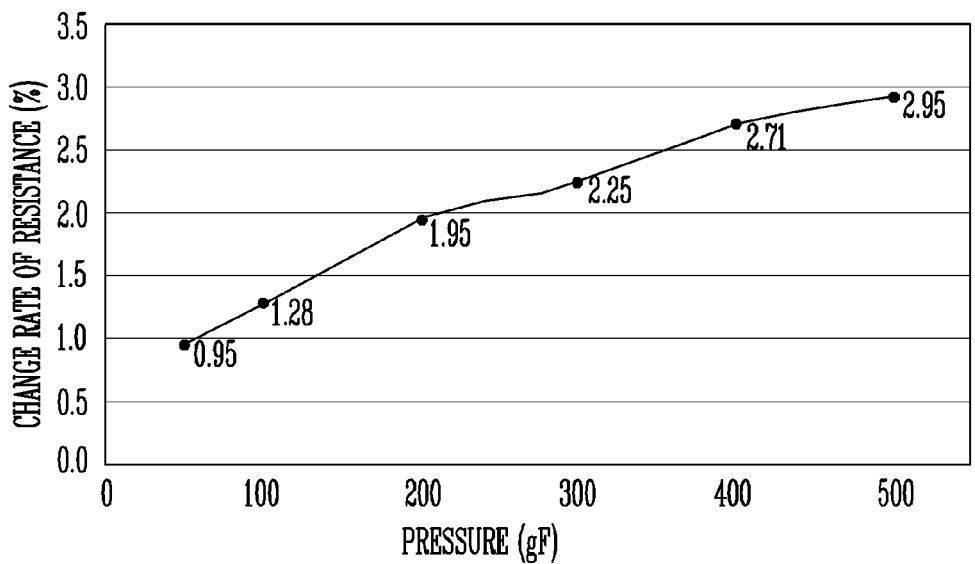
FIG. 5 is a graph illustrating the change rate of resistances inside the sensor by a user's touch pressure according to an exemplary embodiment.

FIG. 5 is a graph illustrating the change rate of resistances inside the sensor caused by a user's touch pressure according to an exemplary embodiment. Referring to FIG. 5, said change rates were measured after depositing silver on a substrate to form the first and second sensing electrodes, then forming a layer of ITO nano-particles on the first and second sensing electrodes, and then pressurizing from top to bottom of the nano-particle layer using a tip made of a silicone material.

Referring to the graph in FIG. 5, as the pressure being applied to the nano-particle layer increases, the change rate of the nano-particle layer increases. Accordingly, in an exemplary embodiment, it is possible to measure the touch pressure of the user by sensing the change of resistance.

Figure 6A:
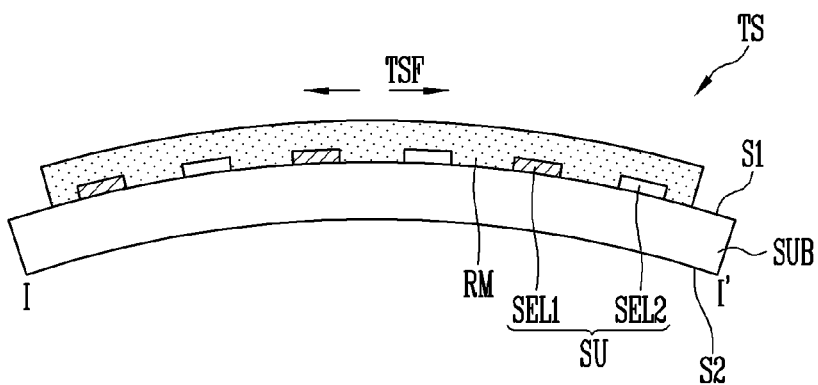
FIGS. 6A and 6B are cross-sectional views of the sensor when bent.
Figure 6B:
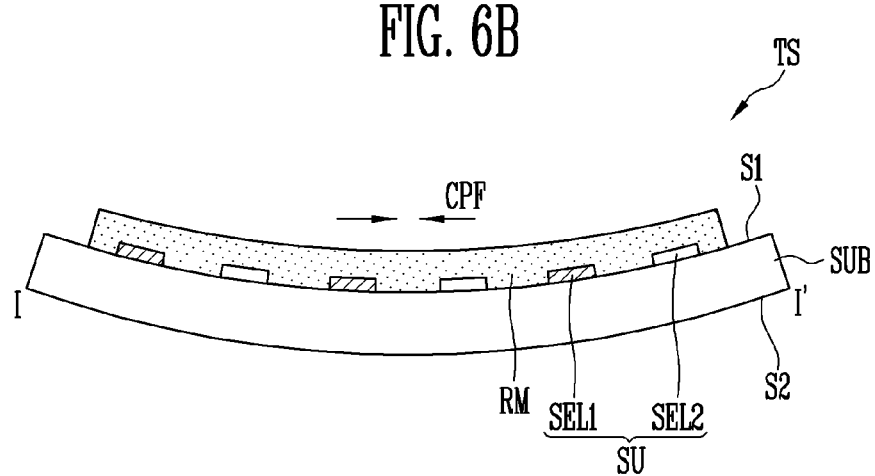

A sensor TS according to an exemplary embodiment may even sense a direction in which the sensor TS itself is bent. FIGS. 6A and 6B are cross-sectional views illustrating appearances of the sensor TS when being bent.

In a sensor according to an embodiment of the present disclosure, supposing a surface of the substrate SUB where the sensing unit SU is formed is a first surface S1 and a surface opposite to the first surface S1 is a second surface S2, FIG. 6A illustrates a case where the first surface S1 is bent convexly, and FIG. 6B illustrates a case where the first surface S1 is bent concavely.

Referring to FIG. 6A, in the case where the first surface S1 is bent convexly, a force of an outward direction, that is, a tensile force TSF may be applied to the resistance element RM, and the distance between the nano-particles inside the resistance element RM may increase. Accordingly, the amount of change of the distance between the nano-particles becomes positive, and the resistance increases.

On the other hand, referring to FIG. 6B, in the case where the first surface S1 is bent concavely, a force of an inward direction, that is, a compressive force CPF is applied to the resistance element RM, and the distance between the nano-particles inside the resistance element RM may be reduced. Accordingly, the amount of change of the distance between the nano-particles becomes negative, and the resistance decreases.

As mentioned above, according to an exemplary embodiment, it is possible to find out the direction in which the sensor TS is bent by measuring the resistance value of the resistance element RM. Accordingly, when the sensor TS is used together with another element, for example, a display panel PNL or the like, the sensor TS according to the embodiment of the present disclosure may be used to measure the direction in which the another element is bent.

In an exemplary embodiment, electrodes of the sensor may be provided in various forms. That is, the electrodes of the sensor may be transformed into various shapes so as to easily sense the change of capacitance between the electrodes that are adjacent to each other and the change of resistance of the resistance element.

Figure 7B:
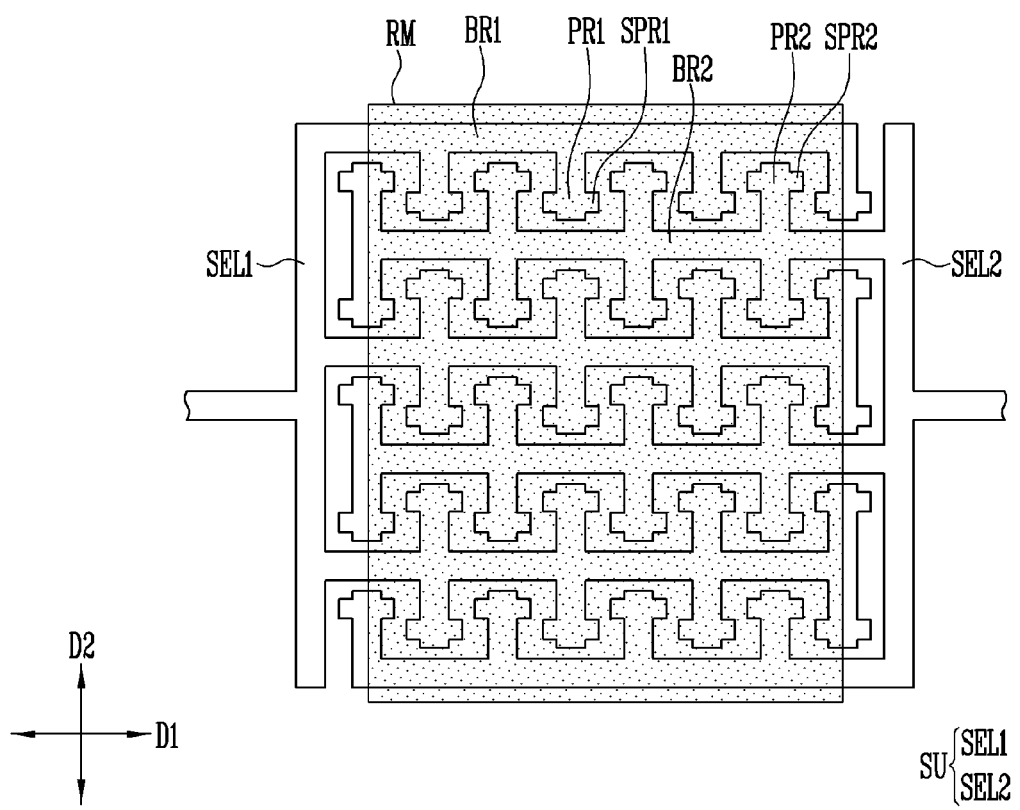

FIGS. 7A and 7B are plan views illustrating shapes of electrodes in sensors according to an exemplary embodiment.

Referring to FIG. 7A, the sensing unit SU includes the first sensing electrode SEL1 and the second sensing electrode SEL2. The first sensing electrode SEL1 may include first branches BR1 and the second sensing electrode SEL2 may include second branches BR2.

In the present exemplary embodiment, the first branches BR1 include first protrusions PR1 protruding from each of the first branches BR1. The first protrusions PR1 may protrude in a direction different from the extending direction of the first branches BR1. For example, in the case where the first branches BR1 extend in a first direction D1, the first protrusions PR1 may extend in a second direction D2 intersecting with the first direction D1.

In the present exemplary embodiment, the second branches BR2 also include second protrusions PR2 protruding from each of the second branches BR2. The second protrusions PR2 may protrude in a direction different from the extending direction of the second branches BR2. For example, in the case where the second branches BR2 extend in the first direction D1, the second protrusions PR2 may extend in the second direction D2 intersecting with the first direction D1.

Referring to FIG. 7B, the sensor includes the first sensing electrode SEL1 and the second sensing electrode SEL2 as illustrated in FIG. 7A. The first sensing electrode SEL1 may include the first branches BR1, and the second sensing electrode SEL2 may include the second branches BR2. Further, the first branches BR1 may include the first protrusions PR1 and the second branches BR2 may include the second protrusions PR2.

Moreover, the first branches BR1 may further include first sub protrusions SPR1 protruding from the first protrusions PR1. The first sub protrusions SPR1 may protrude in a third direction (not shown) that is different from the direction in which the first protrusions PR1 protrude. For example, the first sub protrusions SPR1 may protrude in a direction intersecting with the second direction D2, in which case, the third direction may be substantially the same as the first direction D1.

The second branches BR2 may further include second sub protrusions protruding from the second protrusions PR2. The second sub protrusions SPR2 may protrude in the third direction that is different from the direction in which the second protrusions PR2 protrude. For example, the second sub protrusions SPR2 may protrude in a direction intersecting with the second direction D2, in which case, the third direction may be substantially the same as the first direction D1.

In the aforementioned exemplary embodiments, the first branches BR1 and the second branches BR2 are arranged to cross each other alternately and at the same time they are formed to have protrusions and sub protrusions protruding from the first branches BR1 and the second branches BR2, and thus the distance between the first branches BR1 and the second branches BR2 becomes shorter and areas facing each other become larger. Accordingly, the capacitance between the first sensing electrode SEL1 and the second sensing electrode SEL2 may increase, and the change of capacitance may be easily sensed.

Figure 8A:
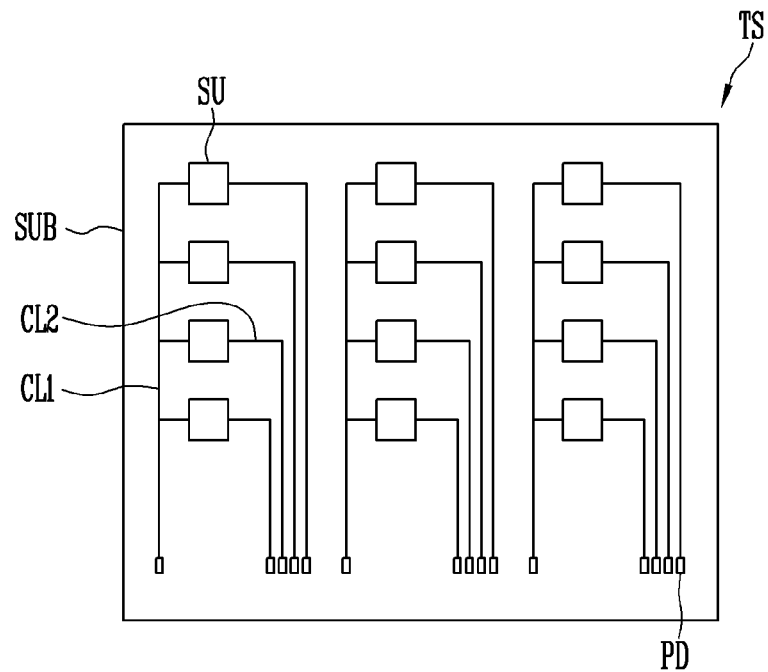
FIGS. 8A, 8B, and 8C are views each illustrating a sensor according to an exemplary embodiment.
Figure 8B:
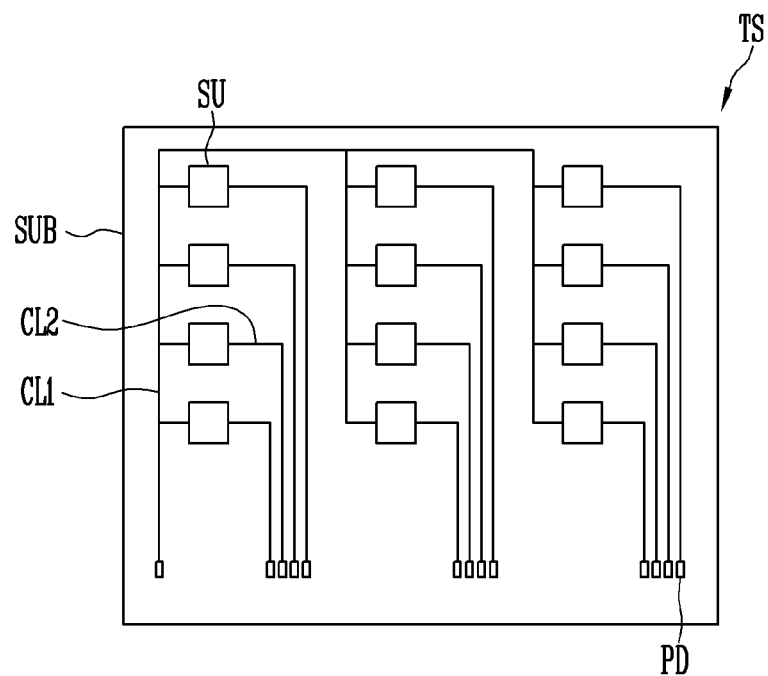
Figure 8C:
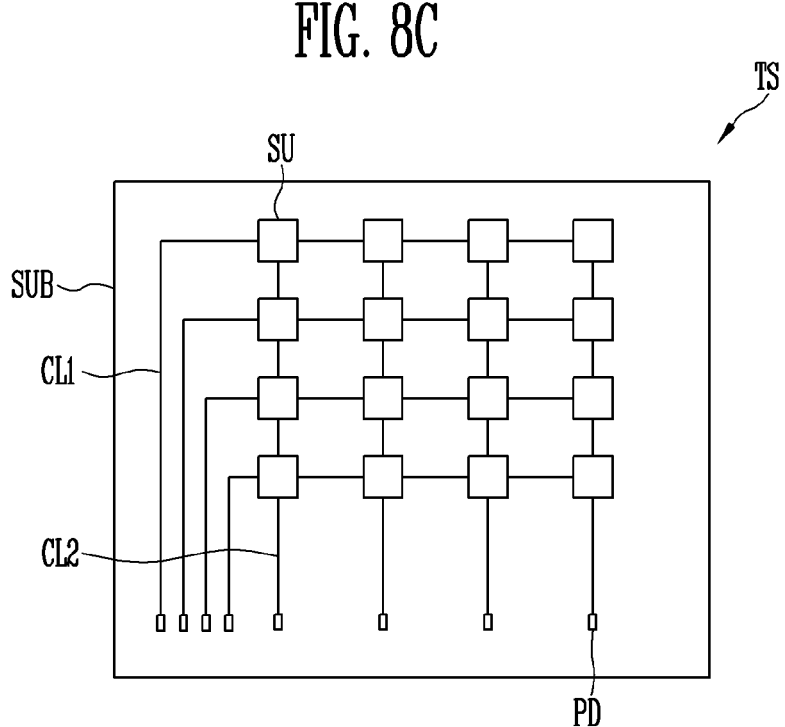

FIGS. 8A, 8B, and 8C are plan views illustrating touch sensors TS according to an exemplary embodiment. In FIGS. 8A, 8B, and 8C, the sensing units SU and the resistance element are arranged in plural on the substrate SUB, but for convenience of explanation, the resistance element is omitted. The resistance elements RM may be arranged on an entirety or a portion of the sensing units SU.

Referring to FIG. 8A, a sensor according to an exemplary embodiment may include a plurality of sensing units SU formed on the substrate SUB.

According to an exemplary embodiment, each of the plurality of the sensing units SU may sense whether or not there is a touch and a touch pressure, and accordingly, the sensor TS may sense multiple touches.

The sensing units SU may be provided in a matrix form having a plurality of lines and a plurality of rows. The sensing units SU may be arranged regularly in only one of the column direction and the row direction and arranged irregularly in the other one of the column direction and the row direction, or the sensing units SU may be arranged irregularly in both the column direction and the row direction. In the present exemplary embodiment, the sensing units SU are illustrated as having the matrix form for convenience of explanation.

A line part may be connected to each of the sensing units SU. The line part may include first lines CL1 connected to one side of each sensing unit SU, second lines CL2 connected to another side of each sensing unit SU, and pads PD connected to one end of the first lines CL1 and the second lines CL2. Accordingly, one end of the first lines CL1 may be connected to the pads PD, and another end of the first lines CL1 may be connected to one side of the sensing units SU. One end of the second lines CL2 may be connected to another end of the sensing units SU and another end of the second lines CL2 may be connected to the pads PD.

The first lines CL1 and the second lines CL2 may be connected to the sensor controller SCP (see FIG. 3) by the pads PD. The pads PD may be connected to the sensor controller by a separate line, a flexible printed circuit board SUB, a tape carrier package, a connector, a chip on film or the like.

The first lines CL1 may provide the driving signal from the sensor controller SCP to the sensing units SU. In an exemplary embodiment, the first lines CL1 may provide the driving signal to the first sensing electrodes SEL1 (refer to FIG. 1) among the sensing units SU.

The second lines CL2 may output a sensed signal in which the change of capacitance and/or the change of resistance is sent from the sensing units SU to the sensor controller SCP. In an embodiment of the present disclosure, the second lines CL2 may receive an output of the sensed signal from the second sensing electrodes SEL2 (see FIG. 1) among the sensing units SU.

Accordingly, the sensor controller SCP may detect the location of touch and the touch pressure using the sensed signal being output from the second sensing electrodes SEL2.

The first lines CL1 and the second lines CL2 may correspond one by one to the sensing units SU and be connected to each of the sensing units SU. However, the first lines CL1 and the second lines CL2 may be connected to the sensing units SU in various methods.

Some of the sensing units SU may share the first line CL1 as illustrated in FIG. 8A, and accordingly, some of the sensing units SU may be connected to the first line CL1 in parallel. The second lines CL2 may be connected to each sensing unit SU one by one. To each sensing unit SU, the same driving signal may be applied through the first line CL1 being shared, and the sensed signal may be obtained from separate sensing units SU along the second line CL2.

All the sensing units SU may share the first line CL1 as illustrated in FIG. 8B, and accordingly, all the sensing units SU may be connected to the first line CL1 in parallel. To each sensing unit SU, a same driving signal is applied through the first line CL1, and as the sensed signal is obtained from separate sensing units SU along the second line CL2, whether or not there is a touch and a touch pressure may be detected.

The sensing units SU may be connected in series to the first lines CL1 and/or second lines CL2 along the column and the row direction as illustrated in FIG. 8C. The sensing units SU in the column direction, among the sensing units SU, may be connected in series to the first lines CL1, and the sensing units SU in the row direction, among the sensing units SU, may be connected in series to the second lines CL2. To the sensing units SU of the column direction, among the sensing units SU, the driving signal is applied sequentially through corresponding first lines CL1, and as the sensed signal is obtained sequentially through corresponding second lines CL2 from the sensing units SU of the row direction, among the sensing units, whether or not there is a touch and a touch pressure may be detected.

According to an exemplary embodiment, the resistance element of the sensor may be arranged in various structures. FIGS. 9A, 9B, 9C, 9D, 9E, 9F, and 9G are views illustrating structures of arrangement of the resistance element according to the exemplary embodiment.

In FIGS. 9A, 9B, 9C, 9D, 9E, 9F, and 9G, a plurality of resistance elements RM are arranged on the substrate SUB. In FIGS. 9A, 9B, 9C, 9D, 9E, 9F, and 9G, the sensing units are arranged on the substrate SUB in plural, but for convenience of explanation, the sensing units are omitted. The resistance elements RM may be arranged on an entirety or a portion of the sensing units.

The resistance element RM may be arranged in various locations and/or densities per unit surface area according to the size of the sensor or the user's expected touch frequency. For example, when there is an area that is frequently touched and an area that is not frequently touched, more resistance elements RM may be arranged in the area that is frequently touched in order to increase the touch sensitivity of that area, and fewer resistance elements RM may be arranged in the area that is not frequently touched. Further, in an area that is touched with a strong force, fewer resistance elements RM may be arranged in that area than in an area that is touched with a weak force, considering that a touch in the area being touched with a strong force may be sensed with a small number of resistance elements RM. In addition, for example, when the sensor is adopted in another electronic device such as a display device, the resistance elements RM may be arranged in various locations and/or densities per unit surface area in consideration of combinations with the another electrode device. In the case of the display device, there may be an area for displaying images and an area that does not display images, and thus the resistance elements RM may be arranged in the area that does not display images, while a smaller number of resistance elements RM or no resistance element RM are arranged in the area for displaying images. Further, even in the area for displaying images, the resistance elements RM may be arranged in various locations and/or densities in an interlocked manner with images.

Figure 9A:
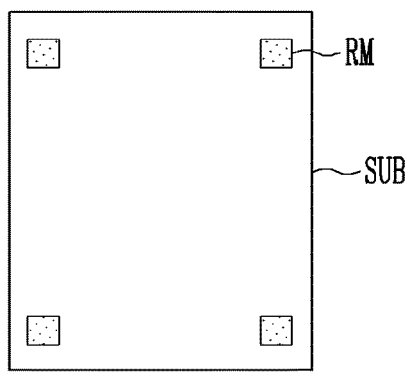
FIGS. 9A, 9B, 9C, 9D, 9E, 9F, and 9G are views illustrating structures of arrangement of a resistance element according to an exemplary embodiment.
Figure 9B:
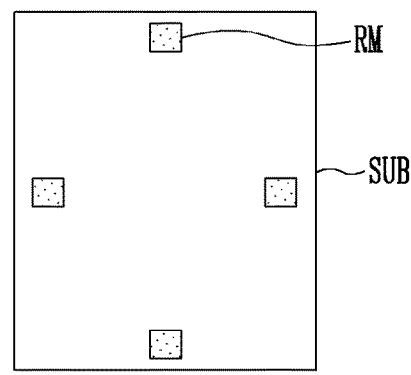
Figure 9C:
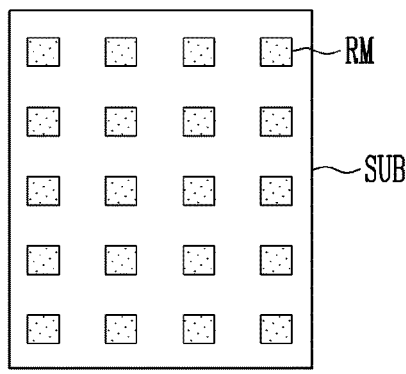

Referring to FIGS. 9A and 9B, the resistance elements RM may be arranged along an edge of the substrate SUB. Referring to FIG. 9C, the resistance elements RM may be arranged regularly on the substrate SUB. For example, the resistance elements RM may be arranged evenly such that the distance between the resistance elements RM are the same.

Figure 9D:
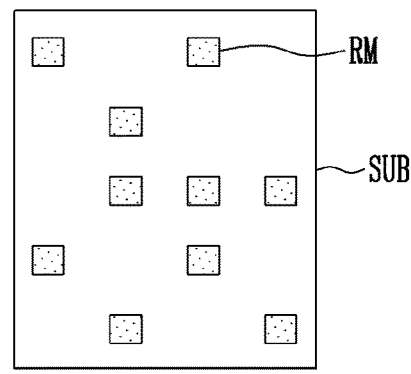

Referring to FIG. 9D, the resistance elements RM may be arranged irregularly on the substrate SUB. For example, the resistance elements RM may be arranged randomly.

Figure 9E:
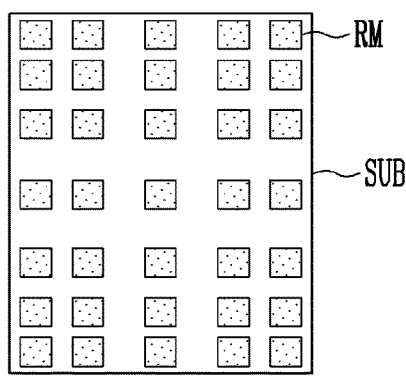

Referring to FIG. 9E, the resistance elements RM may be arranged on the substrate SUB to have different densities depending on their locations. For example, the resistance elements RM may be arranged such that the farther away they are from the center of the substrate SUB, the denser they are arranged. Otherwise, the resistance elements RM may be arranged such that the closer they are to the center of the substrate SUB, the denser they are arranged.

Figure 9F:
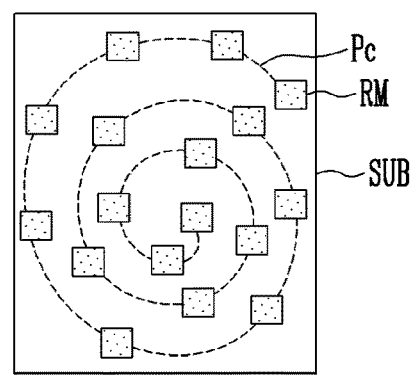

Referring to FIG. 9F, the resistance elements RM may be arranged on the substrate SUB along a curved path Pc. FIG. 8F illustrates a helical curved path Pc as an example, but the curved path Pc may have various shapes.

Figure 9G:
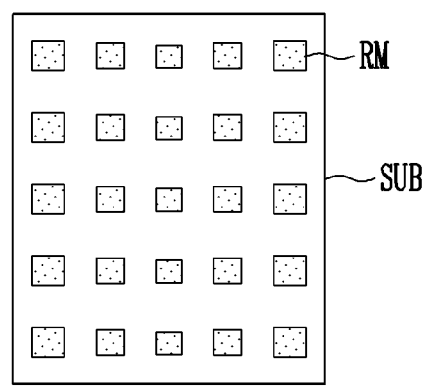

Referring to FIG. 9G, the size of the resistance elements RM may be set differently depending on their locations. For example, the farther away they are from the center of the substrate SUB, the greater their sizes may be.

The resistance element RM of the sensor may be arranged in various thicknesses depending on the size of the sensor or the user's touch state.

Figure 10:
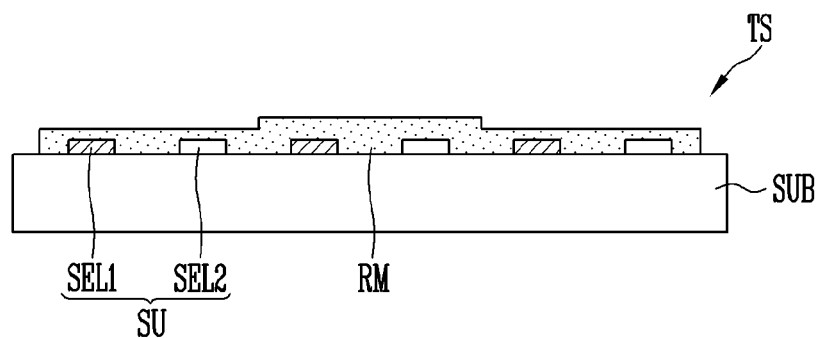
FIG. 10 is a cross-sectional view illustrating a sensor according to an exemplary embodiment.

FIG. 10 illustrates the case where the resistance element RM is provided in different thicknesses depending on its location inside one sensing unit SU. In FIG. 10, the resistance element RM has different thicknesses depending on the location inside one sensing unit SU, but it is not limited thereto. Thus, even if the resistance element RM has a same thickness in one sensing unit SU, its corresponding resistance element RM in another sensing unit SU may have a different thickness.

Figure 11:
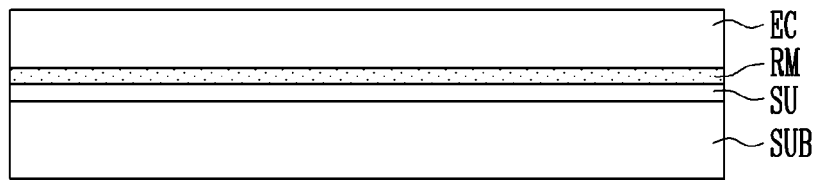
FIG. 11 is a cross-sectional view illustrating a sensor according to an exemplary embodiment.

FIG. 11 is a cross-sectional view of a sensor according to an exemplary embodiment. The sensor includes the substrate SUB, the sensing unit SU and the resistance elements RM, and thus in FIG. 11, it is illustrated that the sensing unit SU and the resistance element RM are formed on the substrate SUB sequentially, for convenience of explanation.

Referring to FIG. 11, a cover EC for covering the resistance element RM may be provided on the resistance element RM. The cover EC may contain optically clear resin (OCR) or optically clear adhesive (OCA). When the cover EC is used as an optically clear adhesive, the sensor may be easily adhered to another element. The cover EC may be flexible and elastic, and accordingly, the cover EC may be transformed and then easily restored.

In an exemplary embodiment, when the cover EC contains the optically clear resin or the optically clear adhesive (OCA), realizing a transparent touch sensor becomes easier.

FIG. 11 illustrates that the cover EC is formed on an entirety of the substrate SUB, but without limitation. That is, the cover EC may cover only a portion of the substrate SUB, for example, an area where the resistance element RM is formed.

A sensor according to an exemplary embodiment may be used in various types of electronic devices, and especially, to a display device and be used as one of the input devices. Here, at least a portion of the display device may be flexible, and the display device may be transformed into various shapes with at least a portion thereof being partially bent, folded or rolled up.

FIGS. 12, 13, 14, and 15 are views illustrating a display device to which a sensor according to an exemplary embodiment is adopted.

Figure 12:
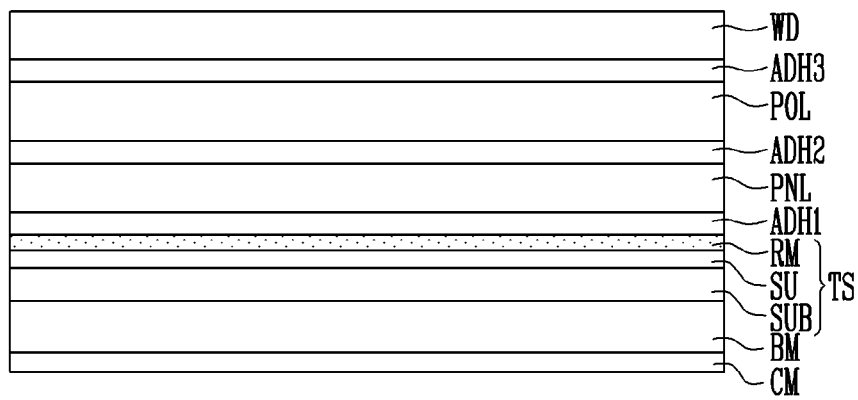
FIGS. 12, 13, 14, and 15 are cross-sectional views illustrating a display device to which a sensor according to an exemplary embodiment is adopted.

Referring to FIG. 12, the display device may include a display panel PNL for displaying images through its front surface, a sensor TS provided on a rear surface of the display panel PNL, a polarizer POL provided on the front surface of the display panel PNL and a window WD.

The display panel PNL may include a plurality of pixels, and display certain images to the user.

The display panel PNL may display images from at least one surface thereof. In an exemplary embodiment of the present disclosure, it is illustrated that images may be displayed from the front surface of the display panel PNL, for convenience of explanation. The front surface from which images are to be displayed may be a flat surface having no curvature or a curved surface having a certain curvature. Alternatively, the surface on which images are to be displayed may be provided in a form such that it is temporarily flat, but may be bent or rolled up at another period of time.

The display panel PNL is an element for displaying images, but is not limited thereto. For example it may be an organic light emitting panel, a liquid crystal display panel, an electrophoresis display panel, an electrowetting display panel, an MEMS display panel or the like.

The sensor TS may be attached to the display panel PNL with a first adhesive ADH1 interposed between the rear surface of the display panel PNL and the sensor TS.

A least a portion of the sensor TS may overlap with the display panel PNL when in a plan view. In an exemplary embodiment, the sensor TS may substantially overlap with an entirety of the area of the display panel PNL on which images are to be displayed.

The sensing unit SU may be arranged to face the display panel PNL. In the substrate SUB of the sensing unit SU, where the surface of substrate SUB on which sensing unit SU is a first surface and the opposite surface of substrate SUB is a second surface, the first surface of the substrate SUB may face a surface of the display panel PNL.

The substrate SUB of the sensing unit SU may serve as a protection film for protecting the display panel PNL.

The polarizer POL may be disposed on the front surface of the display panel PNL with a second adhesive ADH2 disposed therebetween.

The window WD may be provided on the polarizer POL with a third adhesive ADH3 disposed therebetween. The window WD may be provided on the front surface side of the display panel PNL, that is, on the side where images are to be displayed, and protect the display panel PNL. The window WD may be positioned on an upper outermost surface of the display device, thereby protecting the display device from external stress or impact.

The polarizer POL and the window WD may be omitted when necessary.

On a lower portion of the sensor TS, a buffer member BM and a conductive member CM may be further provided.

The buffer member BM may have elasticity. The buffer member BM may include a plurality of buffer members separated from one another.

The buffer member BM may provide a function of alleviating impact from outside, and for this purpose, the buffer member BM may have elasticity. For example, the buffer member BM may have elasticity such that it may be transformed by an external pressure, and once the pressure is removed, it may be restored to its original state.

The buffer member BM may be provided as a porous polymer so that it has elasticity. For example, the buffer member BM may be provided in the form of foam such as a sponge.

The buffer member BM may contain thermoplastic elastomer, polystyrene, polyolefin, polyurethane thermoplastic elastomers, polyamides, synthetic rubbers, polydimethylsiloxane, polybutadiene, polyisobutylene, poly(styrene-butadienestyrene), polyurethanes, polychloroprene, polyethylene, silicone and a combination thereof, but is not limited thereto.

The conductive member CM may be provided on the buffer member BM, and may prevent electromagnetic interference (EMI) in the display device. The conductive member CM may be provided as a metal tape, for example, a copper tape, but is not limited thereto. Thus, the conductive member CM may be provided in any form as long as it can prevent electromagnetic interference.

Figure 13:
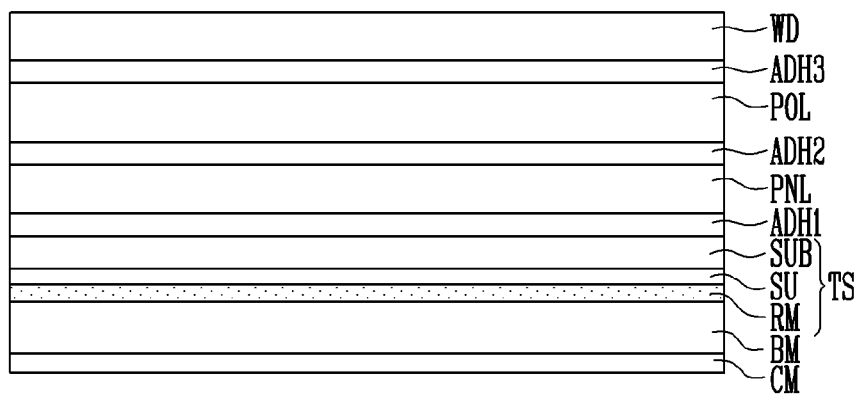

The sensor TS may be arranged within the display device in other methods, and thus, referring to FIG. 13, the sensing unit SU may be provided not to face the display panel PNL with respect to the location of the substrate SUB. In the substrate SUB of the sensing unit SU, supposing a surface of substrate SUB on which the sensing unit SU is formed is a first surface, and the opposite surface of substrate SUB is a second surface, the second surface of the substrate SUB faces a surface of the display panel PNL.

The substrate SUB of the sensing unit SU may serve as a protection film for protecting the display panel PNL.

Figure 14:
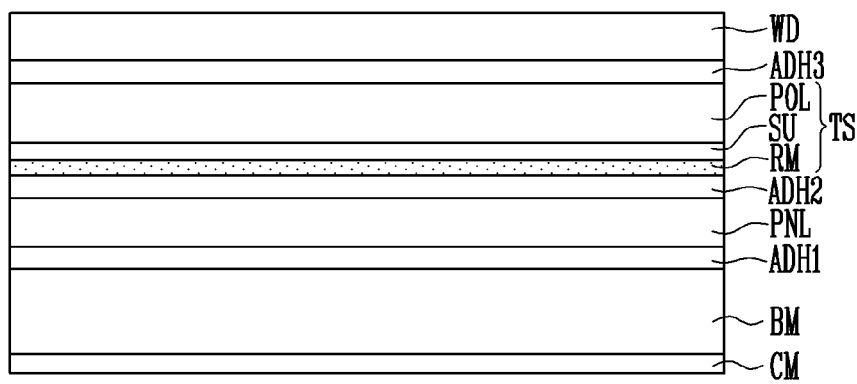

The sensor TS may be arranged in a different format within the display device, and thus, referring to FIG. 14, the sensor TS may be formed integrally with the polarizer POL.

The sensor TS may include the sensing unit SU formed on one surface of the polarizer SOL and the resistance element RM formed on the sensing unit SU, having the polarizer POL as the substrate SUB.

Figure 15:
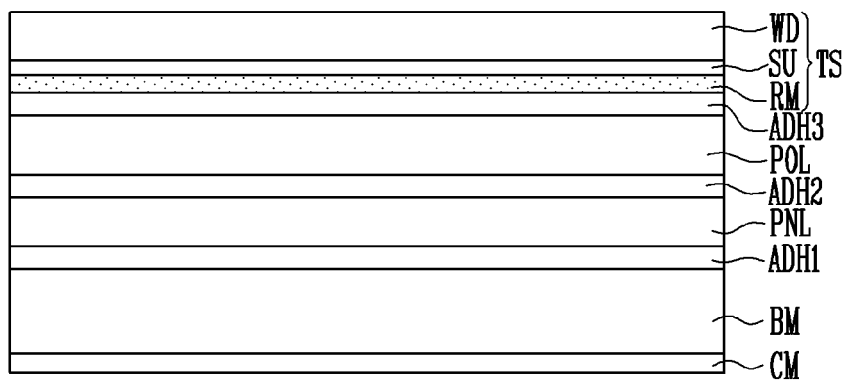

Referring to FIG. 15, the sensor TS may be formed integrally with the window WD.

The sensor TS may include the sensing unit SU formed on one surface of the window WD and the resistance element RM formed on the sensing unit SU, having the window WD as the substrate SUB.

In the case of having the polarizer POL or the window WD as the substrate SUB, there is no need for a separate substrate SUB to form the sensing unit SU or the resistance element RM, and it is possible to provide a polarizing function and a sensor function at the same time.

A display device according to an exemplary embodiment may be used in various kinds of electronic devices. For example, the display device may be used in various kinds of wearable devices such as TV, notebook, mobile phone, smart phone, smart pad PD, PMP, PDA, navigation and smart watch, etc.

According to the aforementioned exemplary embodiments, it is possible to provide a sensor configured to easily identify an intensity of a touch.

Further, according to the aforementioned exemplary embodiments, it is possible to provide a touch sensor configured to complexly identify a touch point and an intensity of the touch at the same time.

Further, according to the aforementioned exemplary embodiments, it is possible to provide a display device provided with the force/pressure sensor and/or the touch sensor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
   a display panel configured to display an image; and
   a sensor provided on at least one surface of the display panel and configured to sense a touch location and a touch pressure,
   wherein the sensor comprises:
   a sensing unit comprising sensing electrodes formed on a same layer, and of which a capacitance changes according to a touch; and
   a resistance element disposed on the sensing unit, and of which a resistance changes according to a pressure of the touch.

2. The display device of claim 1, wherein the resistance element comprises at least one of nano-particles and a force-sensing resistor.

3. The display device of claim 2, wherein the resistance element comprises nano-particles selected from the group consisting of carbon, graphite, metalloid, metal, a conductive oxide of metalloid or metal, a conductive nitride of metalloid or metal, particles of core shell structures of insulating beads coated with the particles, and combinations thereof.

4. The display device of claim 1, further comprising a substrate having an upper surface on which the sensing unit and the resistance element are disposed.

5. The display device of claim 4, wherein the resistance element is arranged regularly on the substrate.

6. The display device of claim 4, wherein the resistance element is arranged irregularly on the substrate.

7. The display device of claim 4, wherein the resistance element is disposed in different densities according to its location on the substrate.

8. The display device of claim 1, further comprising a first line and a second line connected to both sides of the sensing unit.

9. The display device of claim 8, wherein the sensing unit is provided in plural, and at least some of the sensing units are connected to the first line in parallel.

10. The display device of claim 9, wherein the second line is provided in plural, and each second line is connected to each sensing unit.

11. The display device of claim 8, wherein the sensing units are provided in plural in a matrix form, the sensing units of a column direction are connected to the first lines in series, and the sensing units of a row direction are connected to the second lines in series.

12. The display device of claim 1, wherein the sensing electrodes comprise a first sensing electrode and a second sensing electrode spaced apart from each other.

13. The display device of claim 12, wherein the first and second sensing electrodes comprise a same material.

14. The display device of claim 12, wherein the first sensing electrode has first branches, the second sensing electrode has second branches, and the first branches and the second branches are arranged alternately.

15. The display device of claim 14, wherein at least a portion of the first branches and the second branches extend in a first direction.

16. The display device of claim 15, wherein the first branches comprise first protrusions protruding in a second direction that is different from the first direction, and the second branches comprise second protrusions protruding in the second direction.

17. The display device of claim 16, wherein the first branches further comprise first sub protrusions protruding from the first protrusions and protruding in a third direction that is different from the second direction, and the second branches further comprise second sub protrusions protruding from the second protrusions and protruding in the third direction.

18. The display device of claim 1, further comprising a substrate having a first surface and a second surface; and
   an adhesive provided between the display panel and the substrate, and configured to adhere the display panel and the substrate to each other,
   wherein the sensing unit and the resistance element are provided on the first surface of the substrate.

19. The display device of claim 18, wherein one surface of the display panel and the first surface of the substrate face each other.

20. The display device of claim 18, wherein one surface of the display panel and the second surface of the substrate face each other.

21. The display device of claim 18, wherein the substrate is a polarizer provided on a front surface of the display panel.

22. The display device of claim 18, wherein the substrate is a protection film provided on a rear surface of the display panel.

23. The display device of claim 18, wherein the substrate is a window provided on a front surface.

24. The display device of claim 1, wherein the sensing electrodes are formed by being patterned from a same layer.

25. A touch sensor comprising:
   a substrate:
   a sensing unit comprising sensing electrodes formed on a same layer on the substrate, and of which a capacitance changes according to a touch; and
   a resistance element provided on the sensing unit, and of which a resistance changes according to a pressure of the touch.

\* \* \* \* \*